United States Patent [19]

Ott

[11] 3,909,229

[45] Sept. 30, 1975

[54] PLANT NUTRIENTS

[75] Inventor: Louis E. Ott, St. John, Ind.

[73] Assignee: Standard Oil Company, Chicago, Ill.

[22] Filed: Sept. 30, 1974

[21] Appl. No.: 510,169

Related U.S. Application Data

[63] Continuation of Ser. No. 404,367, Oct. 5, 1973, abandoned, which is a continuation of Ser. No. 198,963, Nov. 15, 1971, abandoned.

[52] U.S. Cl. .......................................... 71/64 C; 71/1
[51] Int. Cl.[2] .......................................... C05D 9/02
[58] Field of Search ............ 71/1, 64 C, 54, 58, 59, 71/61

[56] References Cited

UNITED STATES PATENTS

| | | | |
|---|---|---|---|
| 2,957,762 | 10/1960 | Young | 71/59 |
| 2,976,138 | 3/1961 | Hester | 71/1 |
| 3,647,411 | 3/1972 | Stevens | 71/1 |

*Primary Examiner*—Frank A. Spear, Jr.
*Assistant Examiner*—Ferris H. Lander
*Attorney, Agent, or Firm*—Werten F. W. Bellamy; Arthur G. Gilkes; William T. McClain

[57] ABSTRACT

Aqueous ammoniacal ionic solutions of zinc carboxylates, particularly zinc acetate, containing up to about 20 wt. % zinc, provide soluble zinc for plant nutrient purposes. The solution is at least 10% by weight water and includes at least 4 mols of ammonia per mol of zinc.

10 Claims, No Drawings

PLANT NUTRIENTS

CROSS-REFERENCE TO RELATED APPLICATIONS

This application is a continuation of my copending U.S. application Ser. No. 404,367, filed Oct. 5, 1973 which in turn is a continuation of U.S. application Ser. No. 198,963, filed Nov. 15, 1971, both now abandoned.

BACKGROUND OF THE INVENTION

1. Field of the Invention

This invention relates to liquid fertilizers. More particularly, it relates to aqueous ammoniacal ionic solutions of zinc carboxylates, their preparation and use for plant nutrient purposes.

2. Description of Prior Art

Zinc is an essential element in plant nutrition, and a deficiency thereof in the soil is a common cause of poor plant growth. Liquid fertilizers, as clear liquids or suspensions, are advantageously used as vehicles for applying zinc to soil to remedy zinc deficiencies.

The prior art teaches that in a zinc sulfate, ammonia and water system, increasing the proportion of ammonia reduces the solubility of zincammine sulfate. This is pointed out in U.S. Pat. No. 3,130,034 issued Apr. 21, 1964 to Young at column 2, lines 26 to 31. It is stated that "Continued addition of ammonia will salt substantially the entire zinc out of solution". This means that patentee's concentrate is incapable of being added to ammonia to give a $NH_3$/zincammine sulfate solution because of precipitation of the solid species $ZnSO_4 \cdot 4NH_3 \cdot 2H_2O$. Surprisingly, Applicant's zincammine acetate solution can be infinitely diluted at ambient temperatures with agricultural grade anhydrous ammonia to give solutions for fertilizing purposes. This represents a distinct and unexpected advantage in using Applicant's liquid ammonia-zinc alkanoate composition because of the greater solubility of zinc acetate in aqueous ammonia as compared to zinc sulfate.

Zinc oxide, a substantially water-insoluble solid, is the most economical source of zinc for agricultural purposes. However, since it is insoluble in anhydrous and aqua ammonia, and has only limited solubility or forms water-insoluble zinc ammonium salts in acidic liquid ammonium phosphate fertilizers, it has not been possible to effectively utilize this low cost source of zinc in liquid plant nutrient compositions.

According to information published by Tennessee Valley Authority, zinc oxide is soluble only to the extent of 0.05 wt. % zinc in 8-24-0 (N-P-K) ammonium orthophosphate fertilizer solutions, which amount is generally insufficient for agricultural purposes; and in high analysis liquid N-P-K fertilizers such as 10-34-0 (N-P-K) ammoniated polyphosphate solutions made from wet process superphosphoric acid, and 11-37-0 (N-P-K) ammoniated polyphosphate solutions made from furnace grade superphosphoric acid, zinc oxide is soluble only to the extent of 2.25 and 3.0 wt. % zinc, respectively. The improved solubility of zinc oxide in the high analysis liquid fertilizers is apparently due to the metal chelating effect of the polyphosphate ions present in such solutions. While it is possible to obtain practical amounts of zinc in solution via zinc oxide in the aforesaid high analysis liquid fertilizers, it has been found that such solutions are unstable or incompatible, with formation of precipitates, when diluted or blended with other liquid fertilizer ingredients. Consequently, such zinc-containing high analysis fertilizers are only suitable for direct application to soil and not as stock solutions for incorporating zinc in other types of liquid fertilizers such as aqua ammonia, urea ammonium nitrate solutions, low analysis ammonium phosphate solutions, or in mixed N-P-K liquid fertilizers or suspensions containing potassium chloride as the source of potassium. Hence, the fertilizer industry has had to resort to more costly zinc-containing materials, such as zinc sulfate or organic zinc chelates, and techniques for incorporating zinc in liquid fertilizers, especially those containing phosphates.

While many organic or inorganic zinc salts are water-soluble, they are unsuitable for use in phosphate-containing liquid fertilizers because of the formation of insoluble zinc ammonium phosphates which precipitate and cause operational problems. Accordingly, it is desirable to have a liquid zinc-containing product that is soluble in and compatible with all types of N-P-K liquid fertilizers. In this connection, my Example I represents an experimental comparison between the solubility of zinc sulfate and zinc acetate as the proportion of ammonia is increased in (1) a zinc sulfate, ammonia and water system and (2) a zinc acetate, ammonia and water system. Example XII demonstrates the suitability of the zinc solutions of the invention for incorporation in liquid 3-10-8 (N-P-K) fertilizers. Additionally, Example XIII demonstrates the effectiveness of the zinc acetate additive of this invention with two (2) standard zinc carriers. The critical features of this invention include the findings of (1) high solubility of zinc alkanoate in aqueous ammonia and (2) the compatibility of the liquid zinc-containing product of this invention with all types of N-P-K liquid fertilizers.

SUMMARY OF THE INVENTION

It has been discovered that zinc salts of formic and unsubstituted alkanoic acids having the formula R COOH wherein R is hydrogen or alkyl, preferably $C_{1-5}$ alkyl, and most preferably $C_1$ alkyl, can be used effectively as the source of zinc in liquid fertilizers. The liquid zinc compositions of this invention containing up to about 20 wt. % zinc consist essentially of an aqueous ammoniacal ionic solution of a zinc carboxylate. The solution contains at least about 4, preferably 6 or more, mols of ammonia per mol of zinc and at least about 10 wt. % water.

Preparation of the compositions of this invention can be effected by dissolving the zinc carboxylate in aqueous ammonia containing at least 4 mols of ammonia per mol of zinc or by reacting zinc oxide with an ammonia-basic aqueous solution of an ammonium carboxylate containing at least 2 mols of alkanoate anion and at least 4 mols of ammonia per mol of zinc.

The term "zinc carboxylate" as used herein refers to the zinc salt of formic or unsubstituted saturated aliphatic monocarboxylic acids that are capable of reacting with ammonia and being soluble in aqua ammonia. The zinc salts of formic, acetic, propionic, butanoic, pentanoic and hexanoic acids are suitable for forming the compositions of this invention. Zinc acetate is especially preferred because of its ready availability or ease of formation from zinc oxide and acetic acid. It is to be understood that the zinc carboxylate does not exist per se in the ammoniacal solutions but as ionic species. Accordingly, the solutions of this invention are single-phase homogeneous basic solutions of an ionic complex of water, zinc, ammonium and carboxylate ions. Solutions containing from about 10 to about 20 wt. % zinc have low vapor pressures and can be handled at ambient temperatures without the necessity of using pressurized equipment.

The term "aqueous N-P-K liquid fertilizers" as used herein refers to the usual liquid fertilizers, clear or suspensions, containing varying amounts of nitrogen, phosphorous, and potassium; such as, aqua ammonia, aqueous urea ammonium nitrate solutions and the various grades of aqueous nitrogen and phosphorous containing products with or without potassium.

The zinc-containing solutions formed in accordance with this invention are useful per se as liquid fertilizers for applying both zinc and primary plant nutrients to the soil. Solutions containing about 5 to 15 wt. % (about 0.07 to 0.23 mols) of zinc, and an $NH_3/Zn$ molar ratio of about 6 to 9 are especially useful as additive concentrates for incorporating soluble and compatible zinc in other liquid fertilizers such as, aqua ammonia and urea ammonium nitrate solutions, and various grades of the mixed N-P-K clear liquid and suspension fertilizers. The use of the solutions of this invention containing about 5 to 20 wt. % zinc as stock solutions for providing stable and compatible soluble zinc in liquid fertilizers avoids the need for specially manufacturing and storing zinc-containing liquid fertilizers at the locus of their manufacture. Field blending of such stock solutions with the usual liquid fertilizers to obtain desired amounts of zinc therein at the time of application is satisfactorily obtained. Thus, special techniques heretofore required for incorporating zinc in liquid fertilizers is avoided.

DESCRIPTION OF PREFERRED EMBODIMENTS

In the following examples, all parts and percentages are by weight unless otherwise indicated; and the ammonium hydroxide or aqua ammonia reactant contained 28% ammonia.

Example I shows the effect of increasing ammonia concentration upon a zinc sulfate, ammonia and water system. It will be noted that at 38 to 40% ammonia concentration only a trace of zinc sulfate is in solution. Applicant has made a direct comparison between the data from Siedell, *Solubilities of Inorganic and Metal Organic Compounds*, Third Edition, Vol. 1, D. Van Nostrand Company, Inc., 1940, page 1595.

EXAMPLE I

SYNTHESIS OF ZINCAMMINE SULFATE

A. Reagents: by weight

| | | |
|---|---|---|
| Zinc Oxide | 21.8 | 0.268 moles |
| Ammonium Sulfate | 35.4 | 0.268 moles |
| Ammonium Hydroxide (28% $NH_3$) | 42.8 | 0.704 moles |

B. Relationships:

Mole Ratio $\frac{NH_3}{Zn} = 4.63$ Mole Ratio $\frac{SO_4}{Zn} = 1$

Zinc, % = 17.5

C. Procedure:

Ammonium sulfate was dissolved in cooled ammonium hydroxide with stirring. Zinc oxide was added to the solution and stirring continued until the reaction mixture cleared. Approximately 10 minutes were required. When the initially clear reaction mixture was cooled to about 15°–20°F, considerable crystals formed. The mixture was allowed to warm slowly with stirring and the temperature of crystal resolubilization measured. This was 34°F.

The reaction mixture was allowed to warm to 70°F and gaseous ammonia bubbled into the solution. Upon absorption of 3.2 grams of ammonia by the solution it was noted that a copious amount of crystals had formed in the solution which would not redissolve at room temperature. The molar ratio of $NH_3/Zn$ was calculated to be 5.32. The reaction mixture had been observed after addition of 2.3 g of ammonia (mole ratio 5.13) and found to be clear with no crystals.

In a similar experiment a 17.5% zinc solution of zincammine acetate, made from zinc oxide, ammonium acetate, and ammonium hydroxide with an ammonia to zinc molar ratio of 4.25, was cooled to 32°F and gaseous ammonia bubbled into the solution. Sufficient ammonia (10.4 grams) was absorbed by the solution to give an ammonia to zinc molar ratio of 6.5. No crystalline phase was observed. The solution was allowed to warm to room temperature (72°F) and observed. The solution lost 3.0 g of ammonia due to temperature-vapor pressure equilibrium. The ammonia saturated zincammine acetate solution had an ammonia to zinc molar ratio of 5.9 and no evidence of any crystal formation was observed at room temperature.

In Example 1, at 0°C, Applicant has ammonia concentration of 27%, and 44.5% of zinc acetate in a solution that was still not completely saturated. Looking at *Siedell*, at 26.79% ammonia level only 1.26% of zinc sulfate can be held in a saturated solution. Therefore the solubility of zinc acetate under similar ammonia concentrations is more than 35 times greater than inorganic forms of zinc, such as the sulfate.

Additionally, the *Siedell* text teaches that at 18°C (64°F) certain zinc sulfate-water-ammonia combinations can separate into two liquid layers with varying zinc sulfate levels as well as a solid phase. For liquid fertilization this would be a completely intolerable condition for even distribution of micronutrient combinations.

EXAMPLE II

A 10 wt. % zinc concentrate containing an ammonia to zinc ratio of 7 (7 mols ammonia per mol of zinc) was formed by slowly adding, with cooling to moderate the exothermic reaction, 34.5 parts of zinc acetate dihydrate to 65.5 parts ammonium hydroxide (28% ammonia). This solution was used to provide zinc concentrations of 0.25, 1.0 and 2.0 wt. % zinc in liquid 7-24-3 and 3-10-8 grades of aqueous N-P-K fertilizers and no evidence of incompatibility was found. Zinc utilization by corn fertilized with the mixed fertilizers of this example was equivalent to that obtained from organic chelated zinc.

EXAMPLE III

An aqueous solution containing 10 wt. % zinc was prepared by adding 12.5 parts zinc oxide to a solution formed by dissolving 25 parts ammonium acetate salt in 62.5 parts ammonium hydroxide. The reaction was conducted at atmospheric pressure and at a temperature in the range of 50° to 80°F. Complete solution of the zinc oxide was obtained within 5 minutes. The solution, containing an ammonia to zinc molar ratio of 8.9 and 2.06 mols of acetate anion per mol of zinc, contained 14.5% nitrogen, had a pH of 12.9, a salting-out temperature below −30°F, and a carbon steel corrosion rate of 2.1 mils per year.

EXAMPLE IV

A 10 wt. % zinc solution was formed by adding 12.5 parts of zinc oxide to a stirring solution containing 50 parts of ammonium acetate and 37.5 parts water. The product solution had an ammonia and acetate to zinc ratio of 4.3 and was suitable for blending with aqueous nitrogen solutions.

EXAMPLE V 20 parts of glacial acetic acid was added to 67.5 parts aqua ammonia to form an ammonia-basic aqueous ammonium acetate solution. The solution was cooled to 65°F and 12.5 parts zinc oxide added with a temperature rise to about 105°F. The product solution contained 10 wt. % zinc.

EXAMPLE VI

A product containing 17.5 wt. % zinc was formed by neutralizing a solution containing 32 parts glacial acetic acid (0.534 mol) and 26 parts water with 20 parts ammonia (1.18 mol) and cooled to 60°F. To this cooled ammonium acetate solution was added 22 parts zinc oxide (0.27 mol) with an exothermic reaction temperature rise to about 105°F. The resultant product solution had an ammonia to zinc molar ratio of 4.3.

EXAMPLE VII

A solution formed by combining 35 parts ammonium hydroxide (29% ammonia) and 43 parts of solid ammonium acetate had a temperature of 38°F. To this solution was added, with stirring, 22 parts zinc oxide which was completely dissolved within 45 minutes to form a product solution containing 17.5 wt. % zinc.

EXAMPLE VIII 68 parts of zinc acetate dihydrate and 10 parts water were placed in a reactor, provided with cooling means, and ammonia gas passed into the aqueous mixture, with cooling to control the exothermic reaction. After the addition of 22 parts of ammonia, the zinc salt was completely solubilized, giving a product solution containing 20 wt. % zinc.

EXAMPLE IX 50 parts zinc oxide (0.615 mol) was combined with a solution containing 85.2 parts ammonium formate (1.353 mol), 226 parts ammonium hydroxide (3.77 mol ammonia) and 37 parts water to give a solution containing about 10% zinc with an ammonia to zinc molar ratio of about 6.

EXAMPLE X

To an ammonium butanoate solution formed by combining 27 parts butanoic acid with 56 parts ammonium hydroxide and 4.5 parts water was added 12.5 parts zinc oxide. The product solution contained 10% zinc, 2 mols butanoic anion per mol of zinc and had an ammonia to zinc molar ratio of 6.0.

EXAMPLE XI

The addition of 12.5 parts zinc oxide to a previously formed ammonium hexanoate solution (36 parts hexanoic acid and 51.5 parts ammonium hydroxide) formed a stable solution containing 10% zinc containing an ammonia to zinc molar ratio of 5.5.

EXAMPLE XII

A liquid 3-10-8 (N-P-K) fertilizer, containing only orthophosphate phosphoric acid species as the source of phosphorous, was used to determine the suitability of the zinc solutions of the invention as a source of soluble zinc for incorporation of zinc in liquid fertilizers. When amounts, sufficient to provide from 0.1 to 2% zinc in the fertilizer, of the aforesaid exemplary zinc solutions were added to samples of the 3-10-8 liquid fertilizer, clear stable fertilizer solutions were obtained. Thus, formation of liquid zinc-containing solutions in accordance with this invention overcomes the prior art problem of insoluble zinc phosphate formation that occurs when simple water-soluble zinc salts are added to phosphate-containing liquid fertilizers.

EXAMPLE XIII

A zinc deficient soil from western Nebraska, having an alkaline reaction (pH 8.0) was fertilized with three fluid fertilizers containing separately three zinc carriers. The fertilizer materials included a 7-21-7 clear polyphosphate solution, a 6-18-6 orthophosphate solution, and a 4-12-24 polyphosphate suspension. Fertilizer materials were applied at rates of 150 lbs/acre equivalent for the 7-21-7 and the 6-18-6 materials, and at 300 lbs/acre equivalent for the 4-12-24 material to approximate the practice of most farmers. The zinc carriers compared in the study were the 10% zinc solution of Example I, zinc sulfate, and a ligninsulfonate. Zinc was applied in the fluid fertilizer materials to the potted soil at rates of 0.0, 0.312, 1.25, 5.0, and 20.0 lbs/acre equivalent. Pots was separately planted to two single cross corn hybrids, Wf9 × Hy and N6 × N15. These hybrid lines are found in the majority of hybrid corn grown in the midwest. Plants were grown in the greenhouse environment for 8 weeks and watered daily by weight using double-distilled water to approximately ⅔'s of the field capacity moisture content of the soil. Plant samples, taken at the end of 8 weeks, were cut off just above the ground level, dried, weighed, and ground in a stainless steel mill for analysis by X-ray spectrograph for total zinc uptake.

Tables I and II summarize the data obtained in the study of the comparison of the effectiveness of the zinc acetate additive of this invention with 2 standard zinc carriers. These data are an average of 2 replications of each treatment. In general, the zinc acetate was more effective than zinc sulfate and only slightly less effective than the ligninsulfonate carrier as measured by the total zinc uptake by the plants.

TABLE I

| Zinc applied lbs/acre | Single cross corn hybrid, Wf9 × Hy<br>Total zinc uptake in microgram per plant<br>Zinc acetate | Zinc sulfate | Ligninsulfonate |
|---|---|---|---|
| | 7-21-7 clear polyphosphate solution | | |

TABLE I-Continued

| Zinc applied lbs/acre | Single cross corn hybrid, Wf9 × Hy Total zinc uptake in microgram per plant Zinc acetate | Zinc sulfate | Ligninsulfonate |
|---|---|---|---|
| 0.0 | 31 | 31 | 31 |
| 0.312 | 119 | 133 | 129 |
| 1.25 | 131 | 91 | 246 |
| 5.0 | 170 | 67 | 196 |
| 20.0 | 119 | 53 | 152 |
| | 6-18-6 orthophosphate solution | | |
| 0.0 | 21 | 21 | 21 |
| 0.312 | 80 | 22 | 74 |
| 1.25 | 163 | 21 | 190 |
| 5.0 | 177 | 19 | 205 |
| 20.0 | 298 | 126 | 278 |
| | 4-12-24 polyphosphate suspension | | |
| 0.0 | 22 | 22 | 22 |
| 0.312 | 106 | 96 | 126 |
| 1.25 | 160 | 117 | 268 |
| 5.0 | 153 | 130 | 291 |
| 20.0 | 282 | 190 | 220 |

TABLE II

| Zinc applied lbs/acre | Single cross corn hybrid, N6× N15 Total zinc uptake in microgram per plant Zinc acetate | Zinc sulfate | Ligninsulfonate |
|---|---|---|---|
| | 7-21-7 clear polyphosphate solution | | |
| 0.0 | 62 | 62 | 62 |
| 0.312 | 172 | 152 | 284 |
| 1.25 | 198 | 221 | 296 |
| 5.0 | 179 | 169 | 388 |
| 20.0 | 367 | 135 | 372 |
| | 6-18-6 orthophosphate solution | | |
| 0.0 | 56 | 56 | 56 |
| 0.312 | 54 | 37 | 153 |
| 1.25 | 378 | 35 | 354 |
| 5.0 | 193 | 192 | 310 |
| 20.0 | 111 | 112 | 236 |
| | 4-12-24 polyphosphate suspension | | |
| 0.0 | 80 | 80 | 80 |
| 0.312 | 184 | 102 | 170 |
| 1.25 | 383 | 147 | 409 |
| 5.0 | 360 | 118 | 325 |
| 20.0 | 148 | 109 | 274 |

The aforesaid data show that use of the liquid zinc micronutrient compositions of this invention as the source of zinc in the fertilization of growing plants is assimilable by the growing plants and not made unavailable to the plants by chemicals in the soil or in the presence of chloride ions present in the 4-12-24 suspension. It should also be noted that the two hybrids show a difference in their ability to assimilate zinc present in the soil.

It will be apparent to one skilled in the fertilizer art that the present invention provides a simple and effective means for forming the zinc content solutions and a means of utilizing zinc oxide as the source of zinc in liquid fertilizers. In addition to their utility in liquid fertilizers, the solutions are also useful as corrosion inhibitors in highly corrosive aqueous ammoniacal solutions containing nitrate, sulfate, and chloride anions. Further, the low corrosivity characteristics of the zinc-containing solutions of the invention permits their storage and handling in mild carbon steel and thus avoids the necessity of using special metals such as stainless steel.

I claim:

1. A liquid zinc micronutrient composition of an aqueous ammoniacal ionic solution of a zinc carboxylate containing one to five carbon atoms wherein said solution consists of from about 5 to about 20 weight percent zinc, at least about four mols of ammonia per mol of zinc, and at least 10 weight percent water.

2. The composition of claim 1 wherein said solution consists of 10 weight percent zinc.

3. The composition of claim 1 wherein said solution consists of 17.5 weight percent zinc.

4. The composition of claim 1 wherein said solution consists of 20 weight percent zinc.

5. The composition of claim 1 wherein said solution consists of 5 weight percent zinc.

6. The composition of claim 1 wherein said carboxylic acid is selected from the group consisting of formic, acetic and propionic acids.

7. The composition of claim 1 wherein said carboxylic acid is acetic.

8. The composition of claim 1 wherein said carboxylic acid is butanoic.

9. The composition of claim 7 wherein said solution contains from about 10 to 20 weight percent zinc, and from about 6 to 9 mols of ammonia per mol of zinc.

10. The composition of claim 7 wherein said solution consists of 10 weight percent zinc, and from about 6 to 9 mols of ammonia per mol of zinc.

* * * * *